(12) United States Patent
Park et al.

(10) Patent No.: US 11,388,619 B2
(45) Date of Patent: Jul. 12, 2022

(54) METHOD AND APPARATUS FOR PROVIDING COMMUNICATION SERVICE BASED ON A PUSH

(71) Applicant: UBIFUNSTUDIO CO., LTD., Seoul (KR)

(72) Inventors: Jin Hwan Park, Seoul (KR); Ji Sung Kim, Seoul (KR)

(73) Assignee: UBIFUNSTUDIO CO., LTD., Seoul (KR)

( * ) Notice: Subject to any disclaimer, the term of this patent is extended or adjusted under 35 U.S.C. 154(b) by 0 days.

(21) Appl. No.: 16/978,759

(22) PCT Filed: Apr. 15, 2019

(86) PCT No.: PCT/KR2019/004483
§ 371 (c)(1),
(2) Date: Sep. 7, 2020

(87) PCT Pub. No.: WO2020/105815
PCT Pub. Date: May 28, 2020

(65) Prior Publication Data
US 2020/0413282 A1 Dec. 31, 2020

(30) Foreign Application Priority Data
Nov. 19, 2018 (KR) .................. 10-2018-0142872

(51) Int. Cl.
*G06F 15/173* (2006.01)
*H04W 28/02* (2009.01)
(Continued)

(52) U.S. Cl.
CPC ......... *H04W 28/0215* (2013.01); *H04L 67/01* (2022.05); *H04L 67/1093* (2013.01);
(Continued)

(58) Field of Classification Search
CPC ... H04W 28/0215; H04W 4/023; H04W 4/20; H04L 67/1093; H04L 67/141; H04L 67/26; H04L 67/42
See application file for complete search history.

(56) References Cited

U.S. PATENT DOCUMENTS

| 9,020,110 B1* | 4/2015 | Baharav | H04M 15/70 |
| | | | 379/93.12 |
| 2013/0198266 A1* | 8/2013 | Kiley | H04L 67/34 |
| | | | 709/203 |

(Continued)

FOREIGN PATENT DOCUMENTS

| KR | 10-2013-0050202 A | 5/2013 |
| KR | 10-2014-0022257 A | 2/2014 |
| KR | 10-2016-0058075 A | 5/2016 |

OTHER PUBLICATIONS

International Search Report in International Application No. PCT/KR2019/004483, dated Aug. 7, 2019, 2pages.

*Primary Examiner* — Wing F Chan
*Assistant Examiner* — Joseph R Maniwang
(74) *Attorney, Agent, or Firm* — Park, Kim & Suh, LLC

(57) ABSTRACT

Disclosed is a method for providing a communication service based on a push, which may include: when an application loaded on a client is executed, requesting a communication service based on the push keys to an account server; receiving push keys of multiple target clients from the account server; requesting a push server to transfer the push keys of the client and a service request for a predetermined service to at least some of the multiple target clients; and when communication connection with a target client which responds to the service request is performed based on the push keys, performing the predetermined service.

6 Claims, 3 Drawing Sheets

(51) Int. Cl.
 *H04L 67/1087* (2022.01)
 *H04L 67/141* (2022.01)
 *H04W 4/02* (2018.01)
 *H04W 4/20* (2018.01)
 *H04L 67/01* (2022.01)
 *H04L 67/55* (2022.01)

(52) U.S. Cl.
 CPC ............ *H04L 67/141* (2013.01); *H04L 67/55* (2022.05); *H04W 4/023* (2013.01); *H04W 4/20* (2013.01)

(56) References Cited

U.S. PATENT DOCUMENTS

| | | |
|---|---|---|
| 2013/0238763 A1 | 9/2013 | Somani et al. |
| 2014/0304419 A1* | 10/2014 | Yoon .................. H04L 61/2567 |
| | | 709/228 |
| 2016/0285987 A1 | 9/2016 | Huang |

* cited by examiner

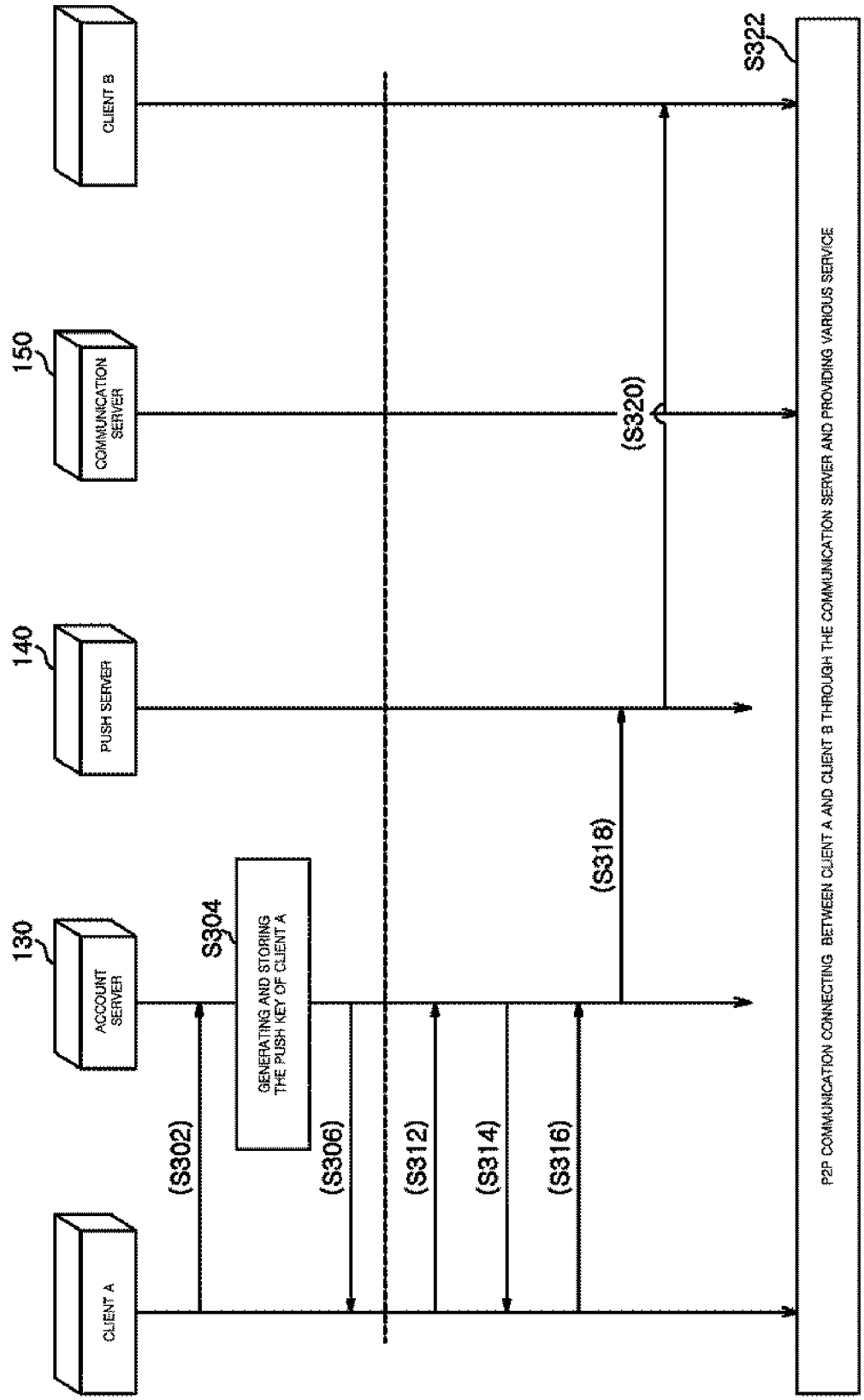

METHOD AND APPARATUS FOR PROVIDING COMMUNICATION SERVICE BASED ON A PUSH

CROSS-REFERENCE TO RELATED APPLICATIONS

This application is the National Stage filing under 35 U.S.C. 371 of International Application No. PCT/KR2019/004483, filed on Apr. 15, 2019, which claims the benefit of Korean Patent Application No. 10-2018-0142872, filed on Nov. 19, 2018, the contents of which are all hereby incorporated by reference herein in their entirety.

TECHNICAL FIELD

The present invention relates to a technique of providing a communication service, and more particularly, to a method and an apparatus for providing a communication service based on a push, which are capable of providing a P2P type communication service based on the push keys.

BACKGROUND ART

In recent years, as the spread of devices (e.g., wireless terminals, etc.) on which various applications are executed, such as smartphones, iPhones, etc., has spread, traffic has increased rapidly, and push-type apps (e.g., SNS, e-mail, etc.) have increased, and as a result, the overload of a network and a server has been serious.

In particular, the Android OS app is generating excessive app signaling, and if contents thereof are described, a specific app is generating signaling tens to hundreds of times per hour, and in some wireless networks, there are also some cases in which some functions in the server (push server) are paralyzed by such excessive app signaling traffic.

DISCLOSURE

Technical Problem

The present invention has been made in an effort to propose a method and an apparatus for providing a communication service based on a push, which is capable of providing a P2P type communication service based on the push keys between clients.

The present invention has also been made in an effort to propose a computer readable recording medium storing a computer program which allows a processor to perform a method for providing a communication service based on a push, which is capable of providing a P2P type communication service based on the push keys between clients.

The present invention has also been made in an effort to provide a computer program stored in a computer readable recording medium, which allows a processor to perform a method for providing a communication service based on a push, which is capable of providing a P2P type communication service based on the push keys between clients.

Problems to be solved by the present invention are not limited to the aforementioned problems and other unmentioned problems to be solved will be clearly understood by those skilled in the art from the following description.

Technical Solution

According to an aspect, the present invention may provide a method for providing a communication service based on a push, which includes: when an application loaded on a client is executed, requesting a communication service based on the push keys to an account server; receiving push keys of multiple target clients from the account server; requesting a push server to transfer the push keys of the client and a service request for a predetermined service to at least some of the multiple target clients; and when communication connection with a target client which responds to the service request is performed based on the push keys, performing the predetermined service.

In the present invention, each step for performing the predetermined service may be executed through the application loaded on the client.

In the present invention, the multiple target clients may be selected based on a location of the client.

In the present invention, the multiple target clients may be selected based on a place of interest preset by a user of the client.

In the present invention, the multiple target clients may be selected based on a specific place selected by the user of the client.

In the present invention, the predetermined service may be any one of a human service, a place service, and a question service.

According to another aspect, the present invention may provide a computer readable recording medium storing a computer program which allows a processor to perform a method for providing a communication service based on a push, in which the method includes: when an application loaded on a client is executed, requesting a communication service based on the push keys to an account server; receiving push keys of multiple target clients from the account server; requesting a push server to transfer the push keys of the client and a service request for a predetermined service to at least some of the multiple target clients; and when communication connection with a target client which responds to the service request is performed based on the push keys, performing the predetermined service.

According to yet another aspect, the present invention may provide a computer program stored in a computer readable recording medium which allows a processor to perform a method for providing a communication service based the push keys, in which the method includes: when an application loaded on a client is executed, requesting a communication service based on the push keys to an account server; receiving push keys of multiple target clients from the account server; requesting a push server to transfer the push keys of the client and a service request for a predetermined service to at least some of the multiple target clients; and when communication connection with a target client which responds to the service request is performed based on the push keys, performing the predetermined service.

According to still yet another aspect, the present invention may provide an apparatus for providing a communication service based on a push, which includes: a communication requesting unit requesting, when an application loaded on a client is executed, a communication service based on the push keys to an account server; a push key receiving unit receiving push keys of multiple target clients provided from the account server in response to the request; a service requesting unit requesting, based on a user interface of a client, a push server to transfer the push keys of the client and a service request for a predetermined service to at least some of the multiple target clients; and a performance controlling unit performing, when communication connection with a target client which responds to the service request is performed based on the push keys, the predetermined service.

Advantageous Effects

According to embodiments of the present invention, a P2P type communication service can be implemented based on the push keys between clients, thereby providing various types of communication services to the clients while effectively suppressing overload in a push server.

DESCRIPTION OF DRAWINGS

FIG. 3 is a signal flowchart of providing a P2P type communication service based on a push to clients according to an embodiment of the present invention.

MODE FOR INVENTION

First, advantages and/or features of the present invention, and a method for achieving the advantages and/or features will become obvious with reference to embodiments to be described below in detail together with the accompanying drawings. However, the present invention is not limited to the embodiments set forth below, and may be embodied in various different forms. However, the present embodiments are exemplarily provided to complete the disclosure of the present invention and make those skilled in the art to clearly understand the scope of the present invention, and as a result, the technical scope of the present invention will be defined by the claims.

Moreover, in describing the embodiment of the present disclosure below, a detailed description of known functions or constitutions will be omitted if it is determined that they unnecessarily make the gist of the present disclosure unclear. In addition, terms to be described below as terms which are defined in consideration of functions in the present invention may vary depending on the intention of a user or an operator or usual practice, of course. Therefore, the definition will be made based on the technical spirit described throughout this specification.

Hereinafter, preferred embodiments of the present invention will be described in detail with reference to the accompanying drawings.

Figure 1:
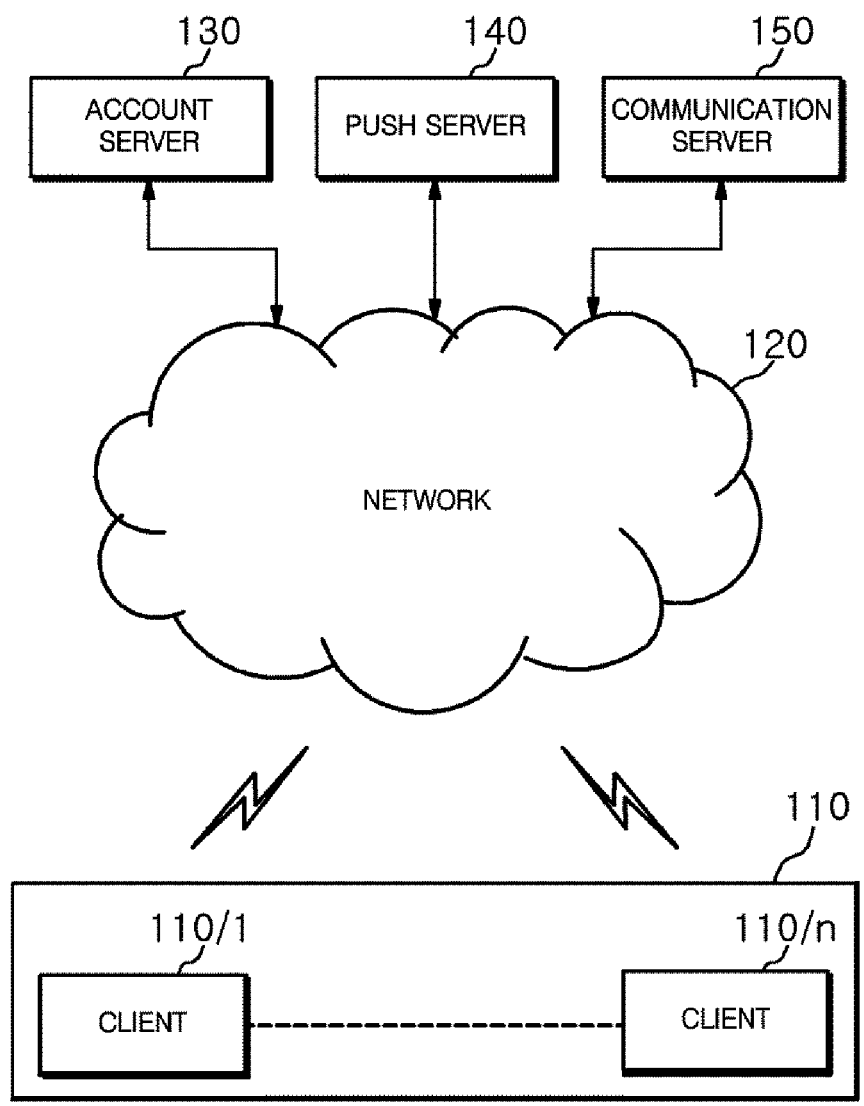
FIG. 1 is a systematic diagram of a communication system to which a communication service based on a push is applicable according to an embodiment of the present invention.

FIG. 1 is a systematic diagram of a communication system to which a communication service based on a push is applicable according to an embodiment of the present invention.

Referring to FIG. 1, a communication system may include a client group 110 constituted by multiple clients 110/1 to 110/*n*, a network 120, an account server 130, a push server 140, and a communication server 150.

First, respective clients 110/1 to 110/*n* in the client group 110 may mean a wireless terminal (e.g., cellular phone, smart phone, PMP, smart pad, smart book, tablet PC, netbook, notebook, etc.) held by service user which is capable of being provided a communication service based on a push provided according to the present invention. Each of the clients 110/1 to 110/*n* may access (accesses via) the account server 130, the push server 140, and the communication server 150 through the network 120 to receive the P2P type communication service based on the push keys implemented according to the present invention.

To this end, an application (app) may be mounted (loaded) on each of the clients 110/1 to 110/*n*, which is capable of implementing the communication service based on a push provided according to the present invention.

Further, each of the clients 110/1 to 110/*n* may access the account server 130 through the network 120 by executing the mounted application to request the communication service. Also, while transmitting the service request for the service, each of the clients 110/1 to 110/*n* may request the account server 130 to transfer a service request for a predetermined service and a push key thereof, through the push server 140, to at least some (one or more clients) among multiple target clients.

Here, the network 120 may be any one of a 2-generation (2G) communication network, a 3-generation (3G) communication network, a 4-generation (4G) communication network, a 5-generation (5G) communication network, and a next-generation communication network, for example, or may include a wireless communication network complexly including two or more communication networks and a wired communication network including wired Internet.

Meanwhile, the communication service provided to each client based on the push keys according to the present invention may include service types including a human service, a place service, a question service, and the like, for example.

Here, the human service may mean a service type such as a photo, text, video, live video chat, and the like, for example, the place service may mean a service type such as searching a desired place, registering the desired place as a place of interest, or connecting a place (e.g., a merchant, etc.) with a customer, for example, and the question service may mean a service type in which a predetermined client asks one or more target clients (target clients which respond to the service request) by using text, video, or moving picture or answers questions of the other party, for example.

Next, when a predetermined client applies for membership by accessing through the network 120, the account server 130 may provide function such as generating a unique push key and registering (storing) the unique push key in a DB (not illustrated) together with corresponding client information (e.g., a name, ID, etc.), transmitting the generated push key to the corresponding client through the network 120 together with the ID, etc.

Further, when a predetermined client requests the communication service, the account server 130 may provide a function such as extracting the push keys of multiple target clients from the DB thereof and transmitting the extracted push keys to the corresponding client through the network 120.

Here, for example, multiple target clients may be selected based on the location of the client requesting the communication service, selected based on a place of interest preset by a user of the client, and selected based on a specific place (place selected together with the service request) selected by the user of the client.

Further, when a service request, to at least some (one or more clients) among multiple target clients, for a predetermined service and the request to transfer push key of the client to the push server 140 are received from the client, the account server 130 may provide a function such as transferring the received service request and the push key to the push server 140.

Here, the push key may be referred to as an access point and may include information (IP, port, etc.) required for communication connection between clients through the communication server 150, for example. In this case, the account server 130 may be referred to as an access point server.

In addition, when the service request for the predetermined service and the push key of the corresponding client are received from the account server 130 according to the present invention, the push server 140 may provide a function such as generating a push message including the push key of the client requesting the communication service and pushing the generated push message to each target client selected as above.

Here, the push message pushed to each target client may include service type information (e.g., human service, place service, question service, etc.) of the communication service.

Accordingly, each of the target clients may respond to the corresponding client (accept the service request) through receiving the push message or reject the service request. Here, when a predetermined target client responds to the service request, the corresponding client and the predetermined target client are directly connected based on the push keys of the corresponding client and the predetermined target client through a wireless communication network controlled by the communication server 150 to receive various communication services (P2P type communication service based on the push key) between each other.

Here, the communication server 150 which may provide various general communication services (e.g., voice communication service, video communication service, text service, data communication service, etc.) generally well known to each of the clients (wireless terminals) may generally mean a server operated by a mobile communication company.

Figure 2:
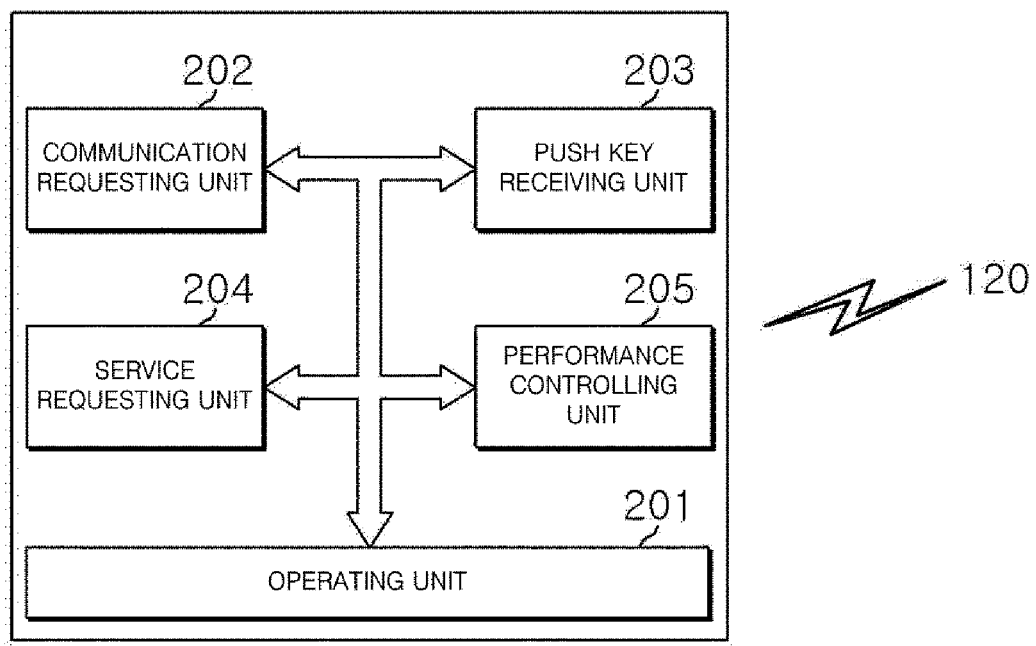
FIG. 2 is a block diagram of an apparatus for providing a communication service based on a push according to an embodiment of the present invention.

FIG. 2 which is a block diagram of an apparatus for providing a communication service based on a push according to an embodiment of the present invention may include an operating unit 201, a communication requesting unit 202, a push key receiving unit 203, a service requesting unit 204, and a performance controlling unit 205.

Referring to FIG. 2, the operating unit 201 may mean a touch interface means mounted on a lower end portion of a display panel (or touch panel) of a client (wireless terminal).

Accordingly, the user of the client may execute the application through a touch interface, request the communication service to the account server 130, transmit the service request and the push key to the account server 130 through the network 120, and may be provided a service such as the P2P communication service with one or more target clients which respond to the service request through the communication server 150 and to this end, a generated user interface signal may be selectively transferred to each corresponding constituent member.

Next, when the application loaded on the client is executed according to the user interface, the communication requesting unit 202 may provide a function such as requesting communication service based on the push keys to the account server 130 and such a request message may include, for example, ID and push key information.

Accordingly, when the request message is received from the corresponding client, the account server 130 extracts the push keys of multiple target clients from the DB thereof and transmits the extracted push keys to the corresponding client through the network 120.

Here, for example, multiple target clients may be selected based on the location of the client requesting the communication service, selected based on a place of interest preset by a user of the client, and selected based on a specific place (place selected together with the service request) selected by the user of the client.

Further, the push key receiving unit 203 may provide a function such as receiving the push keys of multiple target clients provided from the account server 130 through the network 120, and configuring a main screen formed by a service menu corresponding to each push keys and displaying the configured main screen to a display panel (not illustrated) of the client.

Here, each service menu matched for each target client may be constituted by, for example, a face service menu, a place service menu, a question service menu, etc.

Accordingly, the user of the corresponding client may select one or more target clients or a service menu desired thereby, and when such a user interface is input from the operating unit 201, the service requesting unit 204 may provide a function such as requesting the account server 130 to transfer the information (e.g., the push key of each target client) on the selected target client together with the service request for at least one target client and the push key of the corresponding target client to the push server 140.

Thereafter, the account server 130 transfers the service request message received from the corresponding client to the push server 140 together with the push key of the client and the information on the selected target client, and the push server 140 generates the push message including the push key of the client requesting a predetermined communication service and pushes the generated push message to each target client.

Here, the push message pushed to each target client may include service type information (e.g., human service, place service, question service, etc.) of the communication service.

Accordingly, each of the target clients may respond to the corresponding client (accept the service request) through receiving the push message or reject the service request.

Here, when a predetermined target client responds to the service request, the corresponding client and the predetermined target client are connected based on the push keys through a wireless communication network managed by the communication server 150 to receive various communication services (P2P type communication service based on the push key) between each other.

That is, the performance controlling unit 205 may provide a function such as controlling the P2P type communication service (e.g., human service, place service, question service, etc.) based on the push keys and at least one target client, to be performed through the wireless communication network managed by the communication server 150.

Next, a series of processes of providing the P2P type communication service based on the push by using the communication service device according to the embodiment having the aforementioned configuration will be described in detail.

FIG. 3 is a signal flowchart of providing a P2P type communication service based on a push to clients according to an embodiment of the present invention.

Referring to FIG. 3, when a predetermined client on which an application (app) capable of implementing communication service based on a push is loaded accesses the account server 130 through the network 120 to apply for the membership (S302), the account server 130 generates the unique push key and registers (stores) the generated push key in a DB (not illustrated) together with corresponding client information (e.g., name, ID, etc.) (S304).

Thereafter, the account server 130 transmits the push key generated for the corresponding client key to the corresponding client through the network 120 together with the ID (S306). Through such a process, membership registration to issue the push key is completed.

Next, when a predetermined client registered as a member requests the communication service by accessing the account server 130 (S312), the account server 130 extracts the push keys of multiple target clients from the DB thereof and transmits the extracted push keys to the corresponding client through the network 120 (S314).

Here, for example, multiple target clients may be selected based on the location of the client requesting the communication service, selected based on a place of interest preset by a user of the client, and selected based on a specific place (place selected together with the service request) selected by the user of the client.

In addition, the push key receiving unit 203 receives the push keys of multiple target clients provided from the account server 130 through the network 120, and configures a main screen formed by a service menu corresponding to each push key and displays the configured main screen to the display panel of the client.

Here, each service menu matched for each target client may be constituted by, for example, a face service menu, a place service menu, a question service menu, etc.

In addition, the user of the corresponding client may select one or more target clients or a service menu desired thereby and when such a user interface is input from the operating unit 201, the service requesting unit 204 requests the account server 130 to transfer the push key of the client together with the service request for at least one target client and the information on the corresponding target client to the push server 140 (S316).

Thereafter, the account server 130 transfers the service request message received from the corresponding client to the push server 140 together with the push key of the client and the information on each target client (S318).

Next, the push server 140 generates the push message including the push key of the client requesting a predetermined communication service and pushes the generated push message to the each target client (S320). Here, the push message pushed to each target client may include service type information (e.g., human service, place service, question service, etc.) of the communication service.

Accordingly, each of the target clients may respond to the corresponding client (accept the service request) through receiving the push message or reject the service request.

Here, when a predetermined target client responds to the service request, the corresponding client and the predetermined target client are directly connected through the wireless communication network managed by the communication server 150 to execute various P2P type communication services based on the push keys. That is, the performance controlling unit 205 controls one or more target clients and controls the P2P type communication service (e.g., human service, place service, question service, etc.) based on the push keys to be performed through the wireless communication network managed by the communication server 150 (S322).

Meanwhile, combinations of each block of the accompanying block diagram and each step of the flowchart may be performed by computer program instructions. Since computer program instructions may be mounted on a universal computer, a special computer or a processor of other programmable data processing equipment, the instructions performed by the computer or a processor of other programmable data processing equipment generate a means of performing functions described in each block of the block diagram or each step of the flowchart.

Since the computer program instructions may also be stored in a computer usable or computer readable recording medium which may direct a computer or other programmable data processing equipment in order to implement a function in a specific scheme, the instructions stored in the computer usable or computer readable recording medium can also produce manufacturing items including an instruction means performing a function described in each block of the block diagram or each step in the flowchart.

In addition, since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in each block of the block diagram or each step in the flowchart.

Further, each block or each step may represent a part of a module, a segment, or a code that includes one or more executable instructions for executing a specified logical function(s). It should also be noted that in some alternative embodiments, the functions mentioned in the blocks or steps may occur out of order. For example, two successive blocks or steps illustrated may in fact be performed substantially concurrently or the blocks or steps may be sometimes performed in a reverse order according to the corresponding function.

The above description just illustrates the technical spirit of the present invention and various substitutions, modifications, and changes can be made by those skilled in the art to which the present invention pertains without departing from an essential characteristic of the present invention. That is, the embodiments disclosed in the present invention are not intended to limit the technical spirit but describe the present invention and the scope of the technical spirit of the present invention is not limited by the embodiments.

Therefore, the protection scope of the present invention should be construed based on claims to be described below and it should be appreciated that the technical spirit included within the scope equivalent to the claims belongs to the scope of the present invention.

The invention claimed is:

1. A method for providing a communication service based on a push, the method comprising:
  receiving, by a client, a unique push key and a user ID specifically assigned to the client from an account server;
  when an application loaded on the client is executed, transmitting, by the client, a first request message to the account server for a communication service, wherein the first request message includes the unique push key and the user ID of the client;
  receiving, by the client, push keys of multiple target clients from the account server, wherein the account server selects the multiple target clients based on any one of a location of the client, a place of interest preset by a user of the client, and a specific place selected by the user;
  displaying, by the client, a service menu for each target client on a screen and selecting, by the user, at least one of the multiple target clients using the service menu;

transmitting, by the client, a second request message to the account server, wherein the second request message includes a push key of the at least one target client, the unique push key of the client, and a communication service request;

transferring, by the account server, the second request message to a push server;

transmitting, by the push server, a push message to the at least one target client, wherein the push message includes the unique push key of the client and service type information; and performing, by the client, the communication service with the at least one target client.

2. The method of claim 1, wherein the performing the communication service is executed through the application loaded on the client.

3. The method of claim 1, wherein the communication service is any one of a human service, a place service, and a question service.

4. A non-transitory computer readable recording medium storing a computer program which allows a processor to perform a method for providing a communication service based on a push, wherein the method comprises:

receiving, by a client, a unique push key and a user ID specifically assigned to the client from an account server;

when an application loaded on a client is executed, transmitting, by the client, a first request message to the account server for a communication service, wherein the first request message including the unique push key and the user ID of the client;

receiving, by the client, push keys of multiple target clients from the account server, wherein the account server selects the multiple target clients based on any one of a location of the client, a place of interest preset by a user of the client, and a specific place selected by the user;

displaying, by the client, a service menu for each target client on a screen and selecting by the user, at least one of the multiple target clients using the service menu;

transmitting, by the client, a second request message to the account server, the second request message includes a push key of the at least one target client, the unique push key of the client, and a communication service request;

transferring, by the account server, the second request message to a push server;

transmitting, by the push server, a push message to the at least one target client, wherein the push message includes the unique push key of the client and service type information; and performing the communication service with the at least one target client.

5. An apparatus for providing a communication service based on a push, the apparatus comprising a hardware processor configured to:

receive a unique push key and a user ID specifically assigned to a client from an account server;

transmit a first request message to the account server for a communication service when an application loaded on the client is executed, wherein the first request message includes the unique push key and the user ID of the client;

receive push keys of multiple target clients provided from the account server, wherein the account server selects the multiple target clients based on any one of a location of the client, a place of interest preset by a user of the client, and a specific place selected by the user;

display a service menu for each target client on a screen and selecting at least one of the multiple target clients using the service menu;

transmit a second request message to the account server, wherein the second request message includes a push key of the at least one target client, the unique push key of the client, and a communication service request; and perform the communication service with the at least one target client, wherein the account server transfers the second request message to a push server, and the push server transmits a push message to the at least one target client, the push message including the unique push key of the client and service type information.

6. The apparatus of claim 5, wherein the communication service is any one of a human service, a place service, and a question service.

* * * * *